(12) United States Patent  
Sauvinet

(10) Patent No.: US 9,096,307 B2  
(45) Date of Patent: Aug. 4, 2015

(54) PROCESS AND DEVICE FOR AUTOMATICALLY OPTIMIZING ON THE GROUND THE AERODYNAMIC CONFIGURATION OF AN AIRCRAFT

(75) Inventor: Frédéric Sauvinet, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 1256 days.

(21) Appl. No.: 12/713,895

(22) Filed: Feb. 26, 2010

(65) Prior Publication Data

US 2010/0222946 A1  Sep. 2, 2010

(30) Foreign Application Priority Data

Mar. 2, 2009  (FR) ...................................... 09 00926

(51) Int. Cl.
  *G05D 1/00*  (2006.01)
  *B64C 9/32*  (2006.01)
  *B64C 13/16*  (2006.01)
(52) U.S. Cl.
  CPC . *B64C 9/32* (2013.01); *B64C 13/16* (2013.01); *G05D 1/0083* (2013.01); *Y02T 50/32* (2013.01)
(58) Field of Classification Search
  CPC ........ B64C 9/32; B64C 13/16; G05D 1/0083; Y02T 50/32
  USPC ...................................................... 701/3, 16
  See application file for complete search history.

(56) References Cited

U.S. PATENT DOCUMENTS

| 4,482,961 | A | * | 11/1984 | Kilner et al. ..................... 701/16 |
| 6,561,463 | B1 |  | 5/2003 | Yount et al. |
| 2002/0099479 | A1 |  | 7/2002 | Chatrenet et al. |
| 2003/0125848 | A1 | * | 7/2003 | Otake et al. ........................ 701/3 |
| 2005/0065672 | A1 | * | 3/2005 | Chardon et al. .................... 701/4 |
| 2008/0188999 | A1 |  | 8/2008 | Mathieu et al. |
| 2009/0023394 | A1 |  | 1/2009 | Ulloa-Sanzo et al. |
| 2009/0230253 | A1 |  | 9/2009 | Delaplace et al. |

FOREIGN PATENT DOCUMENTS

| GB | 2444742 | 6/2008 |
| WO | WO 2007/074173 | 7/2007 |

OTHER PUBLICATIONS

Chaligne, Charles, "Etude d'un Aerofrein," ESTACA, Jan. 31, 2006, XP002556852, http://charles.chaligne.net/AMDEC_aerofrein.pdf.

* cited by examiner

*Primary Examiner* — Redhwan k Mawari  
*Assistant Examiner* — Rodney P King  
(74) *Attorney, Agent, or Firm* — Novak Druce Connolly Bove + Quigg LLP

(57) ABSTRACT

A process and a device for automatically optimizing on the ground the aerodynamic configuration of an aircraft.
The device (1) includes means (7, 8, 10) for determining and applying to the spoilers (6) a command providing the aircraft with an optimum aerodynamic configuration.

7 Claims, 4 Drawing Sheets

PROCESS AND DEVICE FOR AUTOMATICALLY OPTIMIZING ON THE GROUND THE AERODYNAMIC CONFIGURATION OF AN AIRCRAFT

CROSS-REFERENCE TO RELATED APPLICATIONS

This application claims priority to French Patent Application 0900926, filed Mar. 2, 2009, the entire contents of which are incorporated herein by reference.

FIELD OF THE INVENTION

This invention relates to a process and device for automatically optimizing, on the ground, the aerodynamic configuration of an aircraft, particularly a cargo aircraft, which is equipped with wings provided with spoilers. These spoilers can be deflected downwards when flaps of the aircraft are in a deflected position.

BACKGROUND OF THE INVENTION

It is known that the aerodynamic configuration of an aircraft corresponds to a particular combination of positions of mobile members of an aircraft, such as the landing gear or aerodynamic surfaces arranged on the wings (flaps, ailerons, spoilers, . . . ), the aerodynamic characteristics of the aircraft depend upon. From document WO-2007/074173, means for monitoring landing flaps of a wing profile of an aircraft are known, and from document FR-2899405, means for automatically controlling spoilers are known.

Usually, when designing the aerodynamic configurations of an aircraft, for takeoff phase, the aim is to achieve maximum fineness, that is the maximum ratio of airlift to drag, in order to provide the aircraft with good lifting performance.

The drawback of such a design is that it is required to select a priori the parameter, in this case fineness, which is aimed to be optimised. Such selection does not make it possible to ensure optimum operation in all phases. In particular, optimising fineness can result in:

a non-maximum airlift at the trim of the minimum takeoff speed VMU, because fineness is a compromise between airlift and drag; and a higher drag of the aircraft at zero trim, when the aircraft is in the rolling phase before turning and taking off.

SUMMARY OF THE INVENTION

The object of this invention is to overcome these drawbacks. The invention relates to a process for automatically optimising, on the ground, the aerodynamic configuration of an aircraft equipped with wings which are provided with spoilers (which are likely to be deflected downwards when the flaps of the aircraft are in a deflected position), in order to improve the operation of the aircraft as a whole, particularly upon rolling on an airport track for taking off.

For this purpose, according to the invention, said process is noticeable in that, in an automatic fashion:

I/ the aircraft is monitored to check whether it is on the ground, and if so, the following operations are performed:

II/a) the current value of at least one control parameter of the aircraft (A) is determined;

b) at least using such current value, a criterion is determined; and c) using this criterion and a plurality of predetermined optimum engine angle commands, each of said optimum engine angle commands relating to the deflection of the spoilers and being optimised to provide the aircraft with an aerodynamic configuration for optimising a particular parameter, a current engine angle command is determined, which, when applied to said spoilers, provides the aircraft with a optimum aerodynamic configuration for the current situation of the aircraft.

Preferably, a further step II/d) is additionally carried out, wherein said current engine angle command, determined in step c) is automatically applied to usual actuators of spoilers of the aircraft.

Thus, with the invention, the aerodynamic configuration of the aircraft on the ground is optimised exclusively by deflecting the spoilers of said aircraft.

For that purpose, the value of the criterion is determined, which as detailed below, is representative of the current situation of the aircraft when rolling on the ground, particularly on a track for taking off, and the aerodynamic configuration is optimised, according to this current situation of the aircraft illustrated by said criterion.

In addition, for determining the current engine angle command which represents the optimum engine angle command in the current situation, optimum engine angle commands for optimising a particular parameter such as fineness, drag or airlift, as detailed below, are taken into account.

Further, as such optimisation is performed automatically, the process in accordance with the invention does not increase the workload on the pilot.

Besides, within the scope of the present invention, the control parameter used to determine said criterion may preferably correspond:

to the position of a control stick of the aircraft, which enables the pilot to control trim of said aircraft;

to the trim of the aircraft.

In a particular embodiment:

in step II/a), the current values of at least two control parameters of the aircraft (A) are determined;

in step II/b) a so-called individual criterion is determined for each of said current values, and an overall criterion is derived from the individual criteria thus determined; and in step II/c), said current engine angle command, is determined, using said overall criterion as the criterion.

Further, advantageously, in step II/c), said current engine angle command is determined using said criterion and a predetermined curve which shows the engine angle command as a function of the criterion value, said curve including said optimum engine angle commands and transitions in between such optimum engine angle commands. Preferably, said transitions are linear.

This invention also relates to a device for automatically optimising, on the ground, particularly upon rolling on a track for taking off, the aerodynamic configuration of an aircraft, particularly a cargo aircraft, which is equipped with wings provided with spoilers. These spoilers are likely to be deflected downwards when flaps of the aircraft are in a deflected position.

According to the invention, said device is noticeable in that it includes:

first means for automatically monitoring the aircraft in order to check whether it is on the ground;

second means for automatically determining the current value of at least one control parameter of the aircraft (A);

third means for automatically determining a criterion, using at least such current value; and fourth means for automatically determining a current engine angle command which, when applied to said spoilers, enables to provide the aircraft with an optimum aerodynamic configuration for the current situation of the aircraft, said fourth means determining said current engine angle command using this criterion and a plurality of predetermined optimum engine angle commands, each of said optimum engine angle commands relating to deflection of the spoilers and being optimised to provide the aircraft with an aerodynamic configuration for optimising a particular parameter; and optionally actuators for automatically applying to the spoilers of the aircraft said current engine angle command, determined by said fourth means.

Accordingly, the device in accordance with the invention automatically deflects, on the ground, the spoilers so as to bring them to a position for optimising a particular parameter (fineness, drag, airlift) depending on one or more control parameters (position of control stick, trim of the aircraft), when the aircraft is on the ground (including upon turning at takeoff).

The present invention also relates to an aircraft, particularly a cargo aircraft, which includes an automatic optimisation device, such as the one mentioned above.

BRIEF DESCRIPTION OF THE DRAWINGS

The figures of the appended drawing will give a better understanding of how the invention can be implemented. On these figures, the same references designate similar elements.

DETAILED DESCRIPTION

Figure 1:
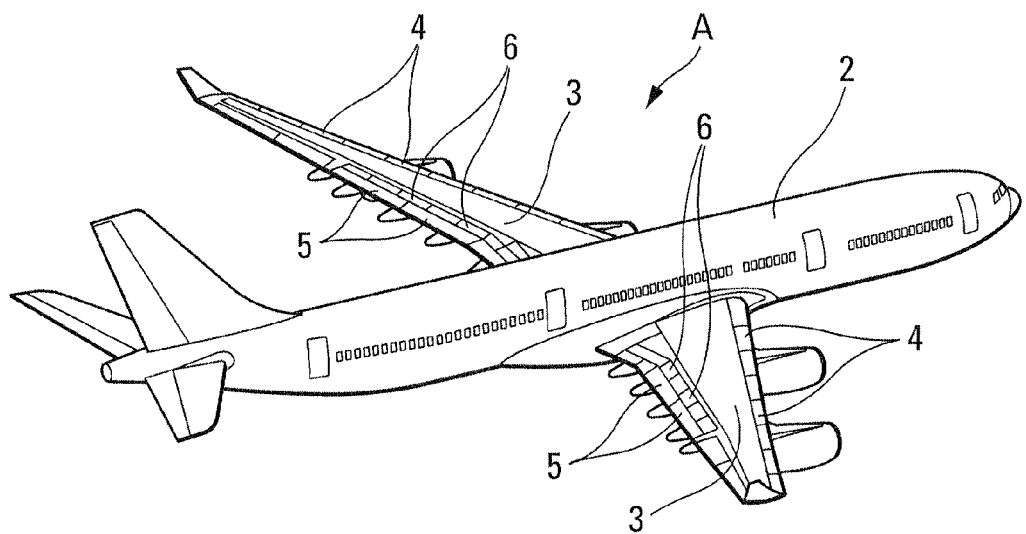
FIG. 1 is a perspective view of a wide-body civilian aircraft, to which a device according to the invention is applied.
Figure 2:
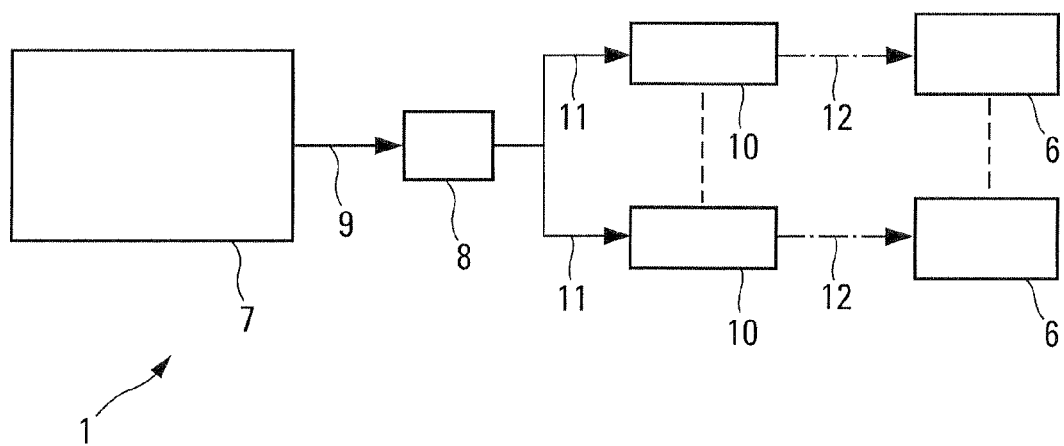
FIG. 2 is a block diagram of an automatic optimizing device according to the invention.

The device 1 according to the invention and schematically represented on FIG. 2 is for automatically optimizing, on the ground, the aerodynamic configuration of an aircraft A as shown, for example, on FIG. 1. The aircraft A of FIG. 1 is a wide-body civilian aircraft which includes a fuselage 2, provided on either side with two symmetric wings 3. Each wing 3 comprises a plurality of aerodynamic surfaces, particularly leading edge hypersustaining noses 4, trailing edge hypersustaining flaps 5 and spoilers 6. It is known that the aerodynamic configuration of an aircraft A corresponds to a particular combination of positions of the mobile members of said aircraft A, such as the landing gear or the aerodynamic surfaces arranged on the wings 3 (flaps 5, ailerons, spoilers 6, . . . ), the aerodynamic characteristics of said aircraft A depend upon.

According to the invention, the device 1 in accordance with the invention automatically optimises, on the ground, the aerodynamic configuration of the aircraft A, by acting exclusively on spoilers 6 of said aircraft A. Such spoilers 6 are likely to be deflected downwards when flaps of the aircraft A are in a deflected position. For that purpose, said device 1 includes, as shown on FIG. 2:

a set 7 for determining a current engine angle command δsc usually representing a current deflection angle to be applied to said spoilers 6;

a unit 8 which is connected through a link 9 to said set 7 and which is adapted for transmitting, through links 11, the engine angle command δsc received from said set 7 to a plurality of usual actuators 10 of the spoilers 6. This engine angle command received from said set 7 corresponds to a deflection angle which is optimised for the current situation of the aircraft A, as explained below. In particular, the unit 8 can break down this engine angle command, which can be an overall command, into individual commands respectively for the different actuators 11; and said spoilers 6 which are deflected in a usual way, by being brought to particular deflection angle values, through said associated actuators 11, as illustrated by links 12 in chain dotted lines.

Figure 3:
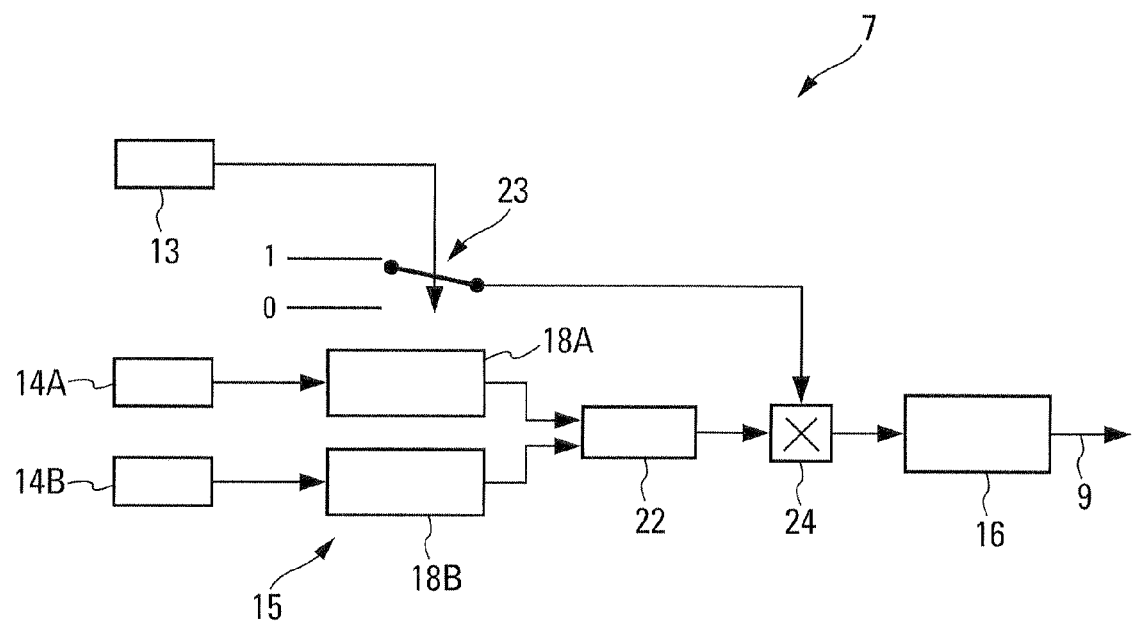
FIG. 3 is a block diagram of a calculation set being part of a device according to the invention.

According to the invention, said set 7 particularly includes, as shown on FIG. 3:

means 13 for automatically monitoring parameters of the aircraft A as to whether it is on the ground or not, the device 1 being only applied to an aircraft A rolling on the ground. Said means 13 usually check whether the aircraft is on the ground, in particular using several parameters, and for example the measure made by an onboard radioaltimeter, of the rotation speed of the wheels of the aircraft A, and/or the landing gear descent;

means 14A, 14B for automatically determining the current value of at least one particular control parameter (set out below) of the aircraft A;

means 15 for automatically determining a criterion C also set out below, at least using this current value or these current values, received from said means 14A, 14B; and means 16 for automatically determining a current engine angle command δsc which, when applied to spoilers 6 of the aircraft A, enables to provide said aircraft A with an optimum aerodynamic configuration for the current situation of said aircraft A.

Said means 16 determine said current engine angle command δsc using the criterion C (received from means 15) and a plurality of predetermined optimum engine angle commands. Each of these optimum engine angle commands is relating to the deflection of the spoilers 6 and is optimised to provide the aircraft A with an aerodynamic configuration for optimising a particular parameter (fineness, airlift, drag).

Thus, optimising, on the ground, the aerodynamic configuration of the aircraft A is performed by the device 1, by determining the value of the criterion C which, as set out below, is representative of the current situation of the aircraft A when rolling on the ground, particularly on a track for taking off, and by optimising the aerodynamic configuration, depending on this current situation of the aircraft A illustrated by said criterion C.

In addition, in order to determine the current engine angle command δsc which represents the optimum engine angle command in the current situation, the means 16 of the device 1 take into account optimum engine angle commands which enable a particular parameter, such as fineness, drag or airlift, to be optimised.

Further, as this optimisation is performed automatically by the device 1, the present invention does not increase the workload on the pilot.

Within the scope of the present invention, at least three parameters can be optimised, each time with a different deflection of the spoilers 6, which adapts the aerodynamic configuration of the airfoil of the aircraft A (that is said wings 3) to said parameter to be optimised. These parameters are the following:

fineness which corresponds to the ratio of airlift to drag. Optimising this parameter results in good lifting performance, particularly upon a breakdown of an engine of the aircraft A. In particular, this optimisation is very advantageous for a twin engine aircraft which loses half of its thrust upon an engine breakdown;

airlift at the trim of minimum useful speed VMU set out below. Optimising this parameter enables to reduce this trim (at the minimum unstick speed) and to obtain better takeoff performance; and drag. Minimizing drag reduces the takeoff run.

To each of the previous parameters is associated a predetermined optimum engine angle command, that is:

δsf, for fineness;
δsVMU, for airlift at the trim of the VMU speed; and
δst, for drag.

These optimum engine angle commands δsf, δsVMU, δst are known and usually depend on characteristics of the aircraft A. These commands can be readily determined from experiments, particularly by flight tests or by tunnel tests.

It is known that the minimum useful speed VMU is a minimum unstick speed which is used in computing the takeoff performance. It enables the length of the takeoff track or the takeoff weight for a given track length to be determined. The lower this speed VMU, the better the takeoff performance of the aircraft. The minimum unstick speed VMU is obtained through testing the following way:

the aircraft A lays on its tail which is equipped with a shoe adapted to avoid a damage thereof and accelerates under these conditions;

the minimum unstick speed then corresponds to the speed obtained, upon such acceleration, which generates an airlift enabling the takeoff of the aircraft A.

This minimum unstick speed is therefore directly representative of the airlift capacity of the aircraft A at the trim θVMU which the aircraft has when it is resting on its tail. By maximising this airlift, said minimum unstick speed VMU is minimised.

Figure 4:
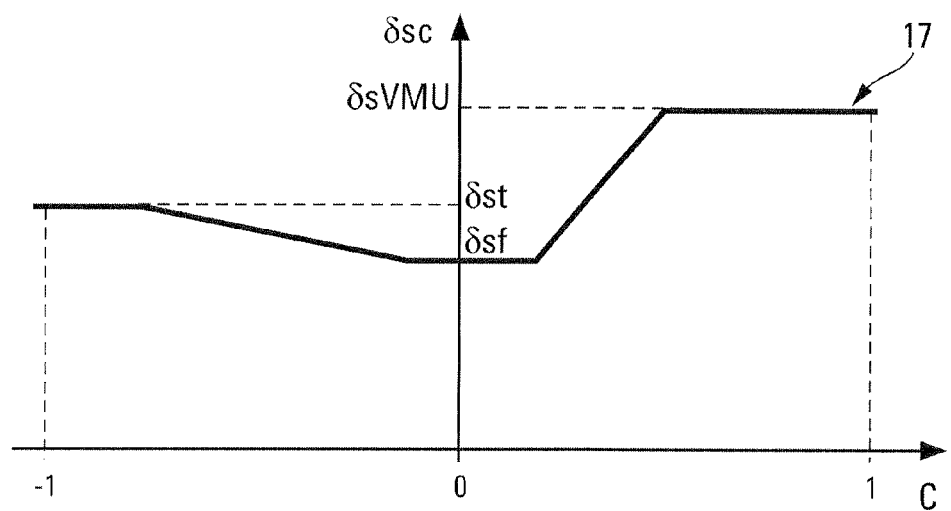
FIG. 4 is a graph illustrating an exemplary current engine angle command variation, as a function of a current value of a criterion used by a device according to the invention.

FIG. 4 shows a curve 17 which is likely to be used by said means 16 for determining the current engine angle command δsc as a function of the value of the criterion C set out below, which can vary from −1 to +1. In the example depicted on FIG. 4, the curve 17 is such that the current engine angle command δsc corresponds:

for a criterion C having a value −1, to the optimum engine angle command δst defined as a step;

for a criterion C having a value 0, to the optimum engine angle command δsf also defined as a step; and for a criterion C having a value +1, to the optimum engine angle command δsVMU also defined as a step.

In addition, this curve 17 includes continuous, in this case linear, transitions in order to provide a smooth change in the current engine angle command δsc. Of course, these continuous transitions can also be non linear.

Besides, within the scope of the present invention, the control parameter(s) used by means 15 in order to determine said criterion C may correspond:

to the position P of a usual control stick of the aircraft A, which enables a pilot to control the pitch of said aircraft A; and to the trim θ of the aircraft A.

In the particular embodiment shown on FIG. 3, the set 7 of the device 1 simultaneously takes into account two control parameters of the aircraft. Thus, said set 7 includes:

means 14A and 14B each of which determines the current values of the particular control parameter, for example the position P of said control stick for one 14A of said means, and the trim θ of the aircraft A for the other 14B of said means;

associated with each of said means 14A and 14B, a computing element 18A, 18B which enables an individual criterion C1, C2, to be determined as a function of the current values respectively provided by said means 14A and 14B. Said computing elements 18A and 18B can in particular use curves such as the ones 20 and 21 respectively depicted in FIGS. 5 and 6 and set out below;

a computing element 22 for determining, from the individual criteria respectively received from said computing elements 18A and 18B, an overall criterion;

switching means 23 which are controlled by said means 13 (which determine whether the aircraft A is on the ground or not) and which are connected to a computing element 24. These switching means 23 are controlled by the means 13 so as to bring the computing element 24 to a value of 1 when the aircraft A is on the ground, and to a value of 0 when the aircraft A is not, or not anymore, on the ground (takeoff); and said computing element 24 which multiplies the (0 or 1) value received via said switching means 23 to the overall criterion determined by said computing element 22 and which provides the obtained value to said means 16 (which derive said current engine angle command δsc therefrom in the manner set out above).

Figure 5:
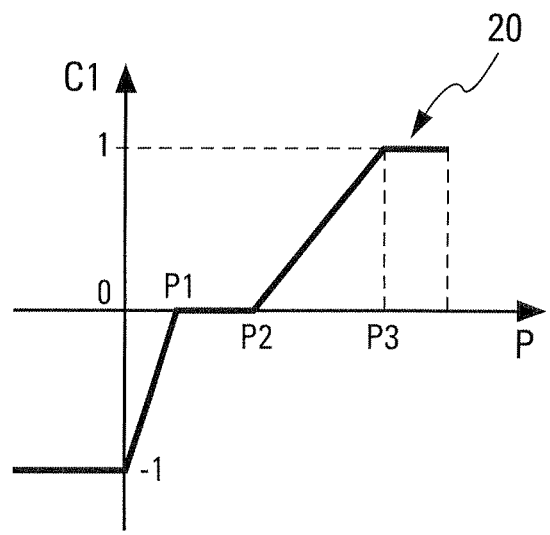
FIGS. 5 and 6 are graphs which show examples of the variation of the value of a criterion, as a function of different control parameters, respectively.

In the example depicted on FIG. 5, said means 14A can usually determine the current value of position P of the usual control stick of the aircraft A, which enables the pitch to be controlled, and said computing element 18A can use a curve 20 such as shown on FIG. 5, which provides the corresponding individual criterion C1 value as a function of the current position of the stick, provided by said means 14A. More precisely:

as long as position of the stick P is set to dive or neutral (0), the criterion C1 has a value of −1. It is known that, upon rolling for taking off, the pilot keeps said control stick to neutral or optionally to dive in order to generate a load on the front wheel;

in between predetermined positions P1 and P2, the criterion C1 has a value of 0, the position P1 corresponding to a slight pull up position of the stick, whereas position P2 (P2>P1) corresponds to a pull up position of the stick which is slightly below a position representing a two-third pull up of the stick; and beyond a position P3 (which is beyond the pull up position P2), the criterion C1 has a value of +1.

In addition, this curve 20 has continuous, in this case linear, transitions between 0 and P1 and between P2 and P3.

Figure 6:
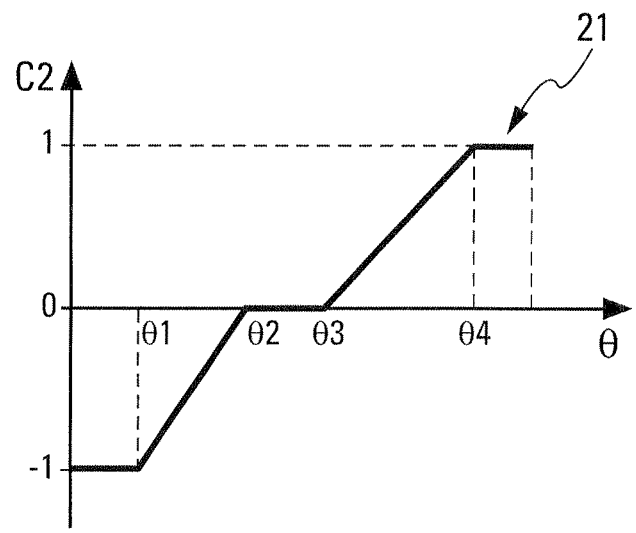

Further, in the example shown on FIG. 6, said means 14B can usually determine the current value of the trim θ of the aircraft A, and said computing element 18B can use a curve 21 as shown on FIG. 6 which provides the value of the corresponding individual criterion C2, as a function of the trim θ provided by said means 14B. More precisely:

as long as the current trim of the aircraft A is below a predetermined trim θ1, the criterion C2 has a value of −1;

in between predetermined trims θ2 and θ3 (θ3>θ2>θ1), the criterion C2 has a value of 0, θ3 being slightly below a trim for which the distance between the low point of the tail of the aircraft A and the track 26 corresponds to 3 feet; and beyond a trim θ4 (θ4>θ3), θ4 being slightly below the touch trim θVMU, the criterion C2 has a value of +1.

In addition, this curve 21 has continuous, in this case linear, transitions in between θ1 and θ2 and in between θ3 and θ4.

A relative condition to the trim θ of the aircraft A is therefore made up, such that the corresponding criterion C2 has the value of 1, when the trim is closed to the touch trim, and the value of 0 for low trims, the transition being carried out in a continuous fashion from a value close to the normal takeoff trim (a value to be determined through testing and which can be specific to each aircraft A).

From these individual criteria C1 and C2, the computing element 22 can determine an overall criterion C which corresponds, for example, to the maximum value of said individual criteria C1 and C2. Accordingly, this overall criterion C has:
- a value of 1, if the pilot carries out a full stick control, showing his desire to take off, or if the aircraft A is under VMU speed trim conditions. In this case, the device 1 applies the deflection δsVMU which maximises airlift;
- a value of 0, if the pilot carries out a normal rotation, where the trim θ remains moderate. The device 1 then applies the deflection δsf which maximises fineness; and
- a value of −1, if the pilot is in rolling phase (undeflected or diving stick) and the trim θ is zero. The device 1 then applies the deflection δst which maximises drag.

The device 1 according to the invention therefore enables to breakdown the shifting phases of the aircraft A, for which a different deflection of the spoilers 6 is desired, in order to optimise the different parameters, that is:
- in the rolling phase, optimising the drag in order to minimise the run;
- in the turning phase, optimising the fineness in order to obtain the best possible lifting performance; and
- in case of high trim during rotation, shifting to a deflection which optimises the minimum unstick speed, in order to obtain the best possible takeoff performance.

Figure 7:
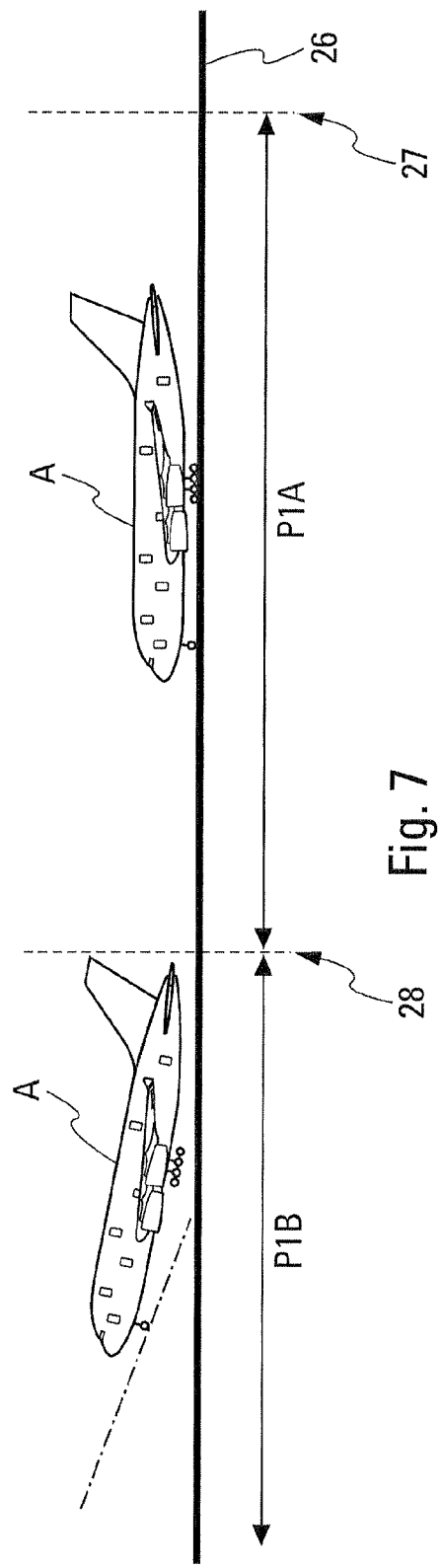
FIGS. 7 and 8 schematically illustrate a rolling phase of an aircraft on a track for taking off, respectively upon a normal taking off and a taking off with maximum trim at a minimum useful speed.
Figure 8:
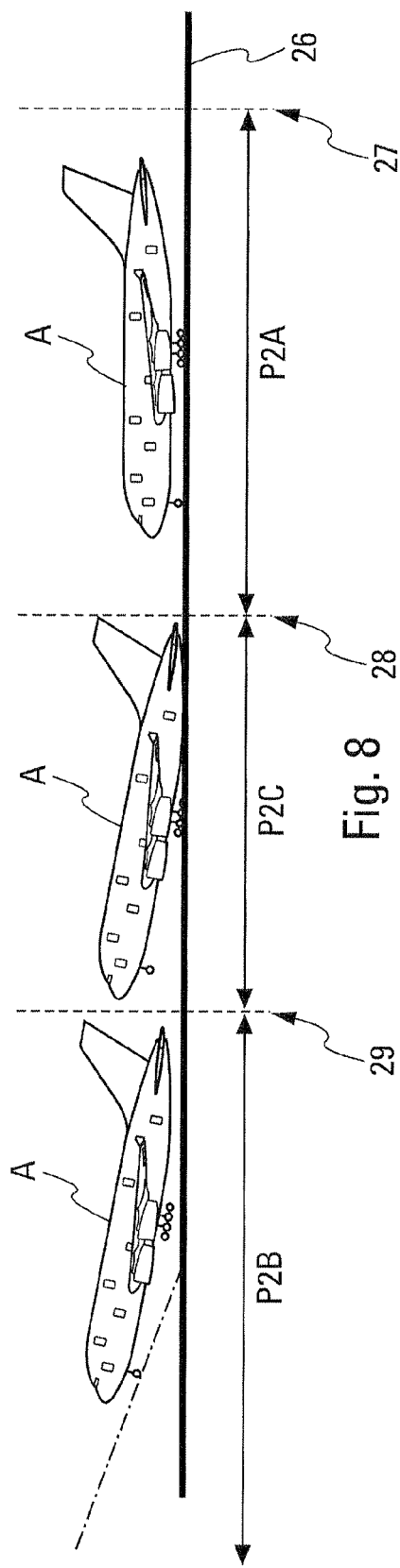

FIGS. 7 and 8 depict the takeoff of an aircraft A which is rolling on a track 26, respectively upon normal taking off and upon taking off under VMU conditions.

Upon normal taking off, as depicted on FIG. 7, the takeoff phase includes:
- a step P1A using a deflection δst optimising the drag, which starts upon brake release, illustrated by reference 27, and which ends with the beginning of rotation (deflected stick), illustrated by a reference 28; and
- a following step P2B, for which the fineness (δst) is optimised.

Further, upon taking off under VMU conditions, the takeoff phase has, between a step P2A which is similar to step P1A on FIG. 7 and a step P2B wherein a deflection δsf optimising fineness is carried out, a step P2C having a high trim zone, for which a deflection δsVMU is carried out which optimises the minimum takeoff speed. Transition between steps P2C and P2B is carried out when the landing gears of the aircraft A are released, which is illustrated by reference 29 on FIG. 8.

The invention claimed is:

1. A process for automatically optimizing on the ground the aerodynamic configuration of an aircraft equipped with wings which are provided with spoilers, wherein,
   I/ monitoring the aircraft to check whether it is on the ground, and if so, the following operations are performed:
   II/a) determining the current value of at least one control parameter of the aircraft;
   b) using at least the current value to determine a criterion; and
   c) using the criterion and a plurality of predetermined optimum deflection angle commands to determine a current deflection angle command,
      each of said optimum deflection angle commands relating to the deflection of the spoilers and being optimised to provide the aircraft with an aerodynamic configuration for optimising a particular parameter, wherein the current deflection angle command, when applied to said spoilers, provides the aircraft with an optimum aerodynamic configuration for the current situation of the aircraft,
   wherein in step II/a), the current value of at least one of the following control parameters is determined:
      the position of a control stick of the aircraft, which enables a pilot to control the pitch of said aircraft; and
      the trim of the aircraft,
   wherein in step II/c), said current deflection angle command is determined using said criterion and a predetermined curve which shows the deflection angle command as a function of the criterion value, said curve including said optimum Deflection angle commands and transitions between such optimum deflection angle commands.

2. The process according to claim 1, wherein a step II/d) is further carried out, in which said current deflection angle command, determined in step c), is applied to actuators of spoilers of the aircraft.

3. The process according to claim 1, wherein:
   in step II/a), the current values of at least two control parameters of the aircraft are determined;
   in step II/b), an individual criterion is determined for each of said current values, and the criterion is derived from the individual criterion thus determined.

4. The process according to claim 1, wherein said transitions are linear.

5. A device for automatically optimizing on the ground the aerodynamic configuration of an aircraft equipped with wings which are provided with spoilers, said device comprising:
   first means for automatically monitoring the aircraft in order to check whether it is on the ground;
   second means for automatically determining the current value of at least one control parameter of the aircraft;
   third means for automatically determining a criterion, using at least such current value; and
   fourth means for automatically determining a current deflection angle command which, when applied to said spoilers, enables to provide the aircraft with an optimum aerodynamic configuration for the current situation of the aircraft, said fourth means determining said current deflection angle command using this criterion and a plurality of predetermined optimum deflection angle commands, each of said optimum deflection angle commands relating to deflection of the spoilers and being optimised to provide the aircraft with an aerodynamic configuration for optimising a particular parameter,
   wherein said second means are formed so as to automatically determine the current value of at least one of the following control parameters:
      the position of a control stick of the aircraft, which enables a pilot to control the pitch of said aircraft; and
      the trim of the aircraft,
   wherein said current deflection angle command is determined using said criterion and a predetermined curve which shows the deflection angle command as a function of the criterion value, said curve including said optimum deflection angle commands and transitions between such optimum deflection angle commands.

6. An aircraft, comprising a device as specified in claim 5.

7. The process according to claim 5, further comprising actuators for automatically applying to the spoilers of the aircraft said current deflection angle command, determined by said fourth means.

* * * * *